Patented June 15, 1937

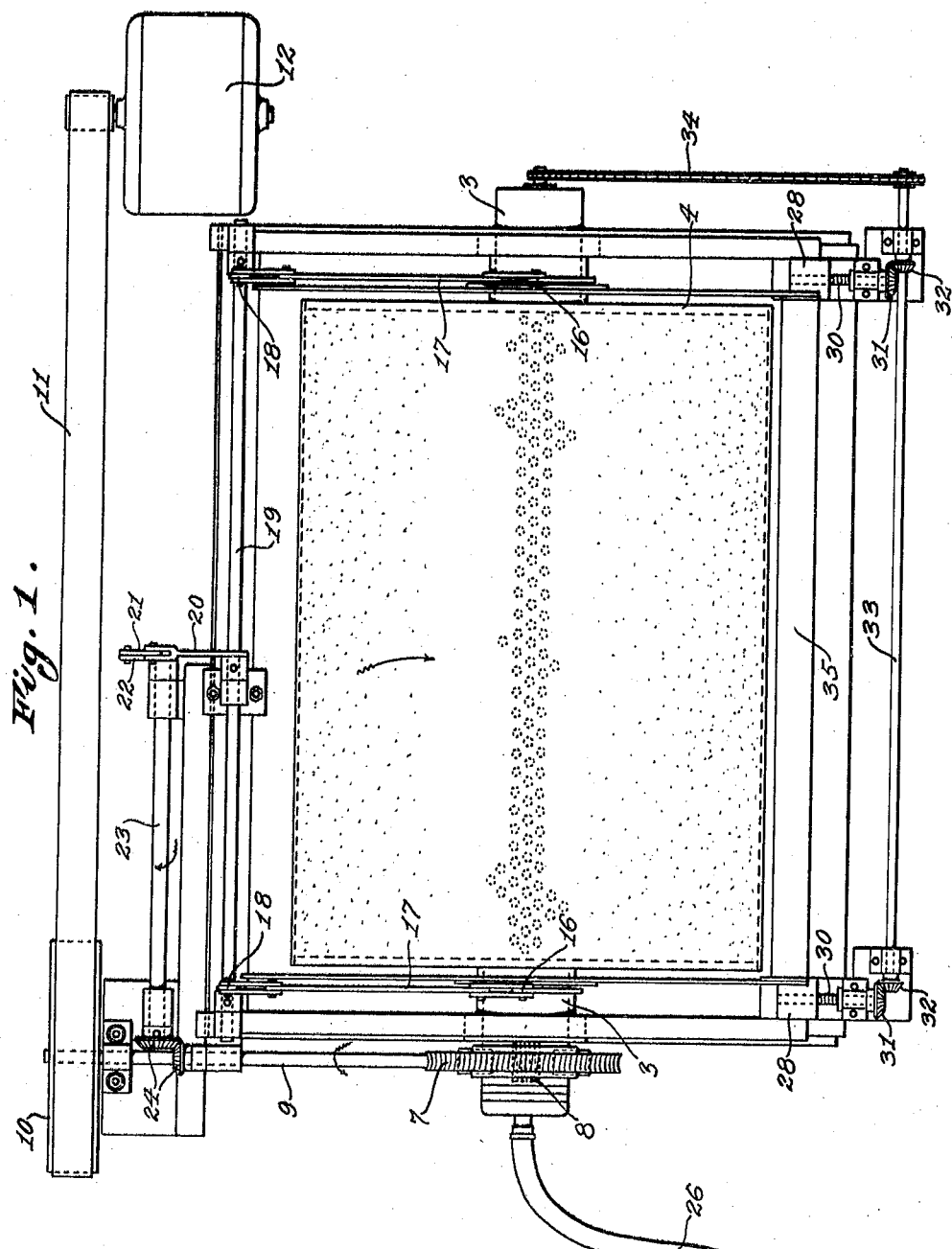

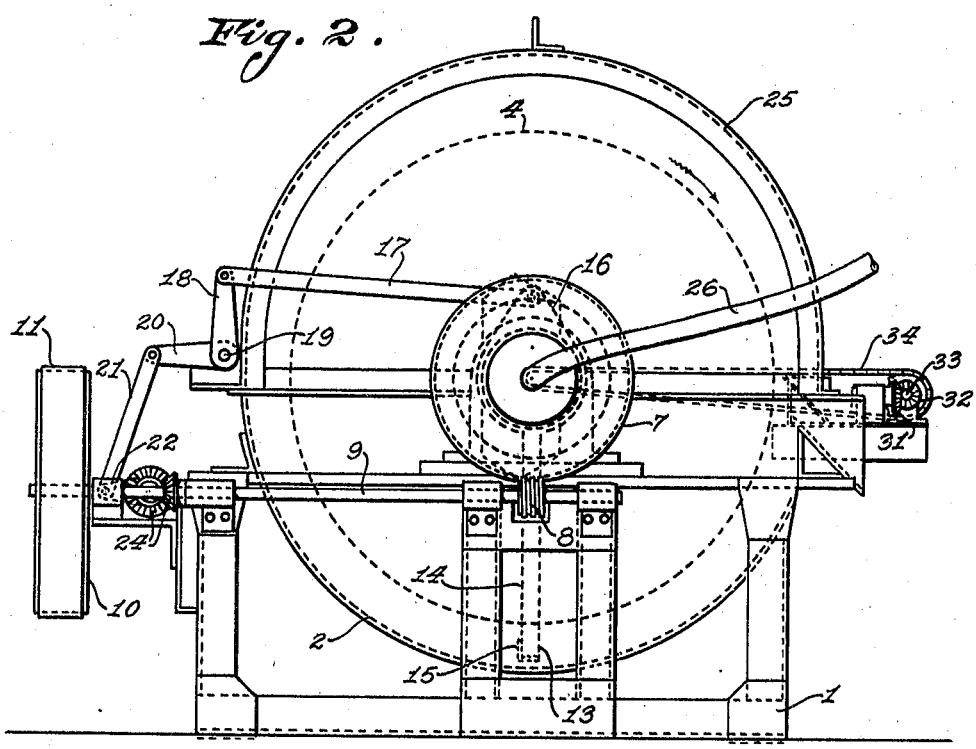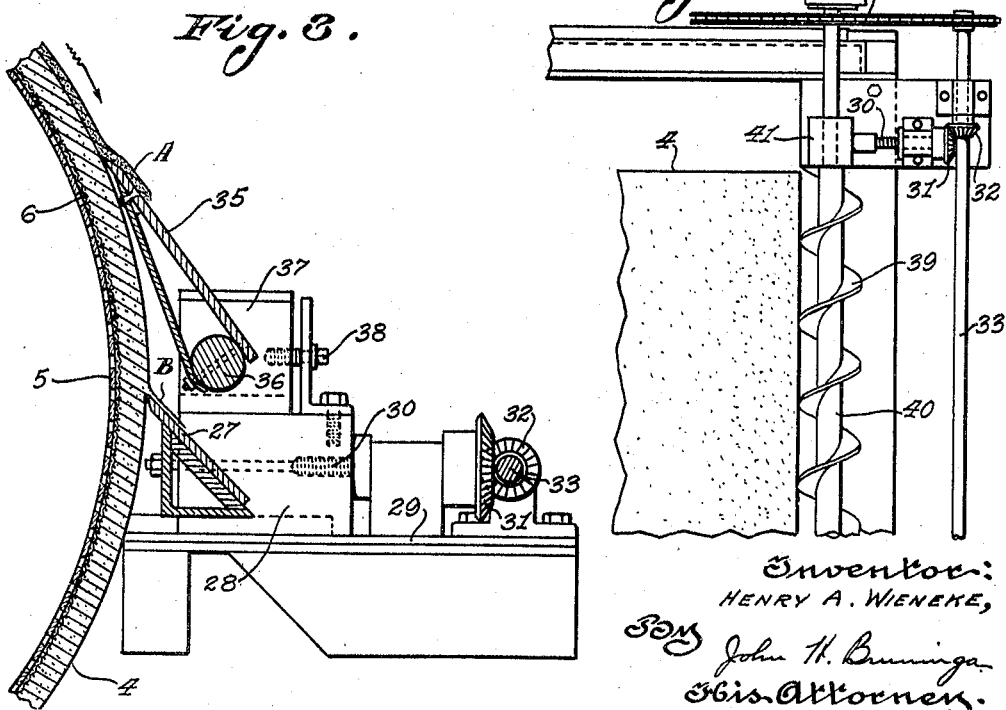

2,083,887

UNITED STATES PATENT OFFICE 2,083,887

PROCESS AND APPARATUS FOR FILTERING

Henry A. Wieneke, St. Louis, Mo.

Application July 5, 1933, Serial No. 679,063

6 Claims. (Cl. 210—201)

This invention pertains to a method and apparatus for filtering and is intended more particularly for the clarifying of liquids by passing the same through a filtering medium usually by suction.

In the clarifying of liquids it is often necessary to remove material from suspension in the liquid which material is very finely divided or of a colloidal nature. In the handling of such liquids it is necessary to provide a filtering medium having pores fine enough to entrap the suspended material. In such a case it is important to keep the filtering medium open or in an unclogged condition so that its efficiency of operation is maintained.

One of the objects of this invention, therefore, is to provide a method by which the filtering or clarifying of colloidal solutions may be carried out under conditions where high filtering efficiency may be maintained for the filtering medium.

Another object is to provide such a method whereby the filtering medium may continually present a fresh surface to the solution.

Another object is to provide apparatus whereby the method of this invention may be carried out in a convenient and efficient manner.

Another object is to provide filtering apparatus having a filtering medium and in which automatic means are provided for continuously renewing the effective surface of the filtering medium.

Another object is to provide such an apparatus of simple construction which will be reliable and durable in service.

Further objects will appear from the following description taken in connection with the accompanying drawings; in which Figure 1 is a plan view of the apparatus embodying this invention and adapted for carrying out the method thereof.

Figure 2 is a left-hand end view of Figure 1.

Figure 3 is an enlarged detail section showing the arrangement of cutters, and

Figure 4 is an enlarged detail view illustrating another type of cutter.

Referring to the drawings, 1 designates a base or frame which may be of any suitable construction and upon which is supported a tank, or basin 2, of any suitable construction preferably semi-cylindrical in form. Journaled in bearings 3 on the frame 1 is a drum 4. The drum 4 has an outer cylindrical body 5 which may be of perforated sheet metal, wire cloth or other suitable material adapted to support a filtering medium. The body 5 may be covered with a layer of fabric 6. This may be wire gauze, burlap, canvas, paper, or other material suitable to the purpose.

The drum may be driven in rotation by any suitable means. In the embodiment illustrated a worm wheel 7 is provided on the drum engageable with a worm 8 on a shaft 9 journaled in the frame 1 and carrying at its outer end a pulley 10 connected in any suitable manner as by a belt 11 to a suitable driving motor 12. The gearing is so adjusted that the drum is driven in rotation at a very low speed. It has been found practical to operate the drum at a speed of one revolution in eight minutes. The drum is arranged to be suspended in the tank, or basin 2, so that its lower portion will be immersed in a solution in the tank. Suitably journaled for oscillating movement on the axis of the drum is an agitating frame 13. This may be provided with vertical hangers 14, one on each end of the drum and lower cross bar 15 extending along the tank 2 below the drum. The hangers 14 have connected thereto upwardly extending arms 16 connected by links 17 to an arm 18 on a rockshaft 19 suitably journaled on the frame 1. A horizontal arm 20 on the shaft 19 is connected by a link 21 to a crank 22 on a shaft 23 journaled on the frame 1 and connected by bevelled gears 24 to be driven by the shaft 9. This arrangement is such that rotation of the crank 22 causes oscillation of the rockshaft 19 which in turn, through the arms 18 and the links 17, imparts a rocking movement about the axis of the drum to the agitator 13. This provides for agitation of the solution in the tank 2 so as to keep matter in suspension at a uniform density which assists in promoting a uniform filtering operation. The tank 2 may be provided with a suitable cover 25.

One of the drum journals may be made hollow and have connection therewith a suction tube 26 connected to any suitable source of vacuum so that the interior of the drum may be exhausted.

In order to provide a prepared filtering medium applied to the body of the drum the tank 2 may be filled with a solution containing a so-called filter-aid material, such as kieselguhr, or the like. Such a material should be capable of being deposited upon the surface of the drum in a precoat having a porous structure with pores fine enough to permit passage of the liquid while entrapping the suspended matter. With the drum immersed in such a solution the apparatus is set in operation so that the drum is rotated and the agitator 13 keeps the liquid agitated.

Suction is applied to the tube 26 so that a partial vacuum is established within the drum. This operates to draw the liquid through the surface material on the drum. This surface material intercepts and holds back the suspended matter. As the drum is rotated the matter intercepted forms as a precoat on the surface of the drum. This precoat is continually built up in thickness as the operation proceeds. In accordance with the present invention this operation is continued until a body of filter-aid material of a thickness many times greater than necessary for filtering the given liquid or suspension, is built up. Such a body of filter aid will be herein termed a "multifold precoat" and may, for instance, have a thickness of one-half or three-quarters of an inch. This provides the drum with a thick surface coating of material adapted to provide a very effective filtering medium for colloidal solutions or the like. Other means or methods of applying the precoat to the drum may, of course, be employed.

In order to start the filtering operation the filter-aid solution may be removed from the tank 2 and the solution to be filtered placed therein. The operation of the drum under suction as before may now be resumed. The suction again acts to draw the liquid through the filtering medium on the surface of the drum. The prepared coating of filter-aid material now intercepts and holds the fine material suspended in the solution being clarified. This intercepted material forms a layer of slime on the surface of the filtering medium. As the operation proceeds this layer of slime may continue to grow heavier and accordingly the outside layers of the filter-aid material may have their pores clogged or loaded with the slime material. When this happens, of course, the filtering efficiency of the medium is reduced.

In accordance with this invention, therefore, means are provided for continually removing not only the layer of slime but also a very thin layer from the outside of the prepared precoat of filter-aid material.

A knife or cutter 27 is mounted on a slide 28 guided for movement radially toward or away from the drum on a bracket 29. The movement of the slide 28 is accomplished by a screw 30 connected by bevelled gears 31 and 32 to be operated on a cross-shaft 33 suitably journaled on the frame 1. The shaft 33 may be connected in any suitable manner as by a sprocket chain 34 to be driven by the rotation of the drum itself. A second cutter 35 may be mounted on a shaft 36 carried by the slide 28. The shaft 36 may be adjustable so that the relation between the cutters 35 and 27 may be adjusted thereby. Shaft 36 may furthermore be carried by a slide 37 mounted for movement on the slide 28 and adapted for adjustment by an adjusting screw 38.

The cutter 35 is preferably adjusted so as to remove from the surface of the drum the layer of slime just deposited. The cutter 27 on the other hand is adjusted so as to remove a thin layer of the filter-aid material itself. This is illustrated in Figure 3, where A represents the layer of slime and B the thin layer of filter aid material being removed. The adjustment of the driving mechanism and the screw 30 is such that the cutter 27 is fed toward the drum at a very low rate of movement. A practical adjustment has been found to be a movement of about one one-hundredth of an inch per revolution.

This feed is continuous so long as the drum is in rotation and accordingly the material is removed from the filter precoat at a uniform rate and in accordance with the operation of the drum. The cutter 27, therefore, continuously removes successive layers of the filtering medium itself so that the outer surface which may be loaded with the slime material is entirely removed at each revolution and a fresh unloaded surface is presented to the liquid to be filtered. In some operations the cutter 35 may be dispensed with as the cutter 27 may remove not only the outer layer of the filtering medium itself, but also the deposit of slime thereon. The use of the cutter 35 is of advantage when it is desired to dispose of the slime separately and to recover the filtering medium cut off by the cutter 27.

Figure 4 shows a modification in the use of a rotary type cutter. Instead of the cutter 27 a cutter 39 of helical form may be provided. This is carried by a shaft 40 separately driven by any suitable source of power, not shown. The shaft 40 is journaled in a pair of slide blocks 41, only one of which is shown in the drawings. These blocks are arranged to be fed by the screw 30 in the same manner as the slides 28 already described. The shaft 40 may be driven at any suitable speed, a speed of several hundred revolutions per minute having been found practical. In this case also a very thin layer of the filtering medium is removed during each revolution of the drum.

It will be noted that this invention provides an improved filtering method which is capable of operation at a high efficiency as it maintains a fresh and unloaded prepared filtering surface exposed to the liquid operated upon. At each revolution of the drum a layer of the prepared filtering medium which has intercepted a certain quantity of the material in suspension is completely removed. The removal of this material at each revolution not only clears the filtering surface, but prevents the same surface passing through the bath more than once, and, therefore, avoids building up too thick a layer of slime and furthermore avoids the penetration of the slime material deeply into the body of the filtering medium.

It will be noted that in this process the prepared filtering coating is placed upon the drum to an excessive thickness. By this is meant a thickness greater than is required to carry out the desired filtering action. By thus providing an excess thickness, the solid material filtered out becomes lodged in the pores of the outer layer only of the coating; and while this layer may become clogged, after a certain time of operation, the filtering efficiency is maintained by progressively shaving off the clogged layer so that there is always presented a fresh filtering surface.

The apparatus provided by this invention is simple and such as to be easily adjustable to the service required. The provision of two cutters makes it possible to recover the filtering medium, which is often expensive, and to dispose of the slime material separately.

While the apparatus of this invention has been described as a unitary device, it will be understood, of course, that various individual features or subcombinations thereof may be useful by themselves and independently of the rest of the complete combination. It is understood, therefore, that the employment of such individual features or subcombinations of features is contemplated by this invention and within the scope of the appended claims. It is further obvious that various changes may be made, within the scope of the appended claims, in the details of construction and operation without departing from the spirit of this invention; it is to be understood therefore that this invention is not limited to the specific details shown and/or described.

Having thus described the invention, what is claimed is:

1. In the art of filtering liquids containing entrained matter of colloidal size, the process comprising, preparing a multifold precoat of filter aid material of a character such that penetration of colloidal matter is restricted to the surface layers thereof, moving the multifold precoat through a bath of the liquid to be filtered to successively expose sections of the precoat to the liquid, forcing the liquid into the precoat as sections thereof are exposed to the liquid, and, between successive exposures of each section, shaving a fractional part of the multifold precoat therefrom, whereby upon each exposure of the precoat sections to the liquid a filter surface substantially unloaded of colloidal matter is presented.

2. In the art of filtering liquids containing entrained matter of colloidal size, the process comprising, preparing a multifold precoat of filter aid material of a character such that penetration of colloidal matter is restricted to the surface layers thereof, continuously applying a negative pressure against one side of the multifold precoat, circuitously moving the multifold precoat through a bath of liquid to be filtered so that part only of the precoat surface is exposed at one time to the liquid, and continuously removing a fractional part of the multifold precoat from the portion thereof which is not exposed to the liquid, said fractional part of the multifold precoat constituting the surface layers which have been substantially penetrated by colloidal matter disentrained from the liquid being filtered.

3. In the art of filtering liquids containing entrained matter of colloidal size, the process comprising, preparing a multifold precoat of filter aid material of a character such that penetration of colloidal matter is restricted to the surface layers thereof, intermittently exposing the exterior of sections of the multifold precoat to the liquid to be filtered to saturate such sections of multifold precoat with such liquid, continuously applying negative pressure against the interior of said multifold precoat to extract liquid therefrom, and, after substantially extracting liquid from previously saturated sections but before resaturation thereof, shaving therefrom a fractional part of the multifold precoat to provide a precoat surface substantially devoid of colloidal matter disentrained from the liquid.

4. Filtering apparatus, comprising, a rotatable drum, a screen on said drum adapted to receive a prepared filtering medium composed of disintegrable material, means for rotating said drum, a cutter mounted adjacent said drum adapted to cut off a thin layer of said material as the drum revolves, a second cutter adjustable to remove the accumulated slime from the filtering medium, and means adapted to feed both said cutters continuously toward said drum.

5. Filtering apparatus, comprising, a rotatable drum, a screen on said drum adapted to receive a prepared filtering medium composed of disintegrable material, means for rotating said drum, a cutter mounted adjacent said drum adapted to cut off a thin layer of said material as the drum revolves, a carrier for said cutter slidable toward said drum, feeding means adapted to move said carrier to continuously feed said cutter toward said drum, and a second cutter mounted on said carrier adapted to remove the accumulated slime from the filtering medium.

6. Filtering apparatus, comprising, a rotatable drum, a screen on said drum adapted to receive a prepared filtering medium composed of disintegrable material, means for rotating said drum, a cutter mounted adjacent said drum adapted to cut off a thin layer of said material as the drum revolves, a carrier for said cutter movable toward said drum, a micrometer feed adapted to continuously move said carrier toward said drum, and a second cutter mounted on said carrier adapted to remove the accumulated slime from the filtering medium.

HENRY A. WIENEKE.